PROCESS FOR QUENCHING EXTRUDED POLYMERIC FILM

Original Filed July 21, 1961 3 Sheets-Sheet 1

INVENTORS
JOHN EDWARD OWENS
WOLF RANDOLPH VIETH
BY Herbert McDonald
ATTORNEY

PROCESS FOR QUENCHING EXTRUDED POLYMERIC FILM

Original Filed July 21, 1961 3 Sheets-Sheet 2

INVENTORS
JOHN EDWARD OWENS
WOLF RANDOLPH VIETH

BY Herbert M. Wolfson
ATTORNEY

PROCESS FOR QUENCHING EXTRUDED POLYMERIC FILM

Original Filed July 21, 1961 3 Sheets-Sheet 3

INVENTORS
JOHN EDWARD OWENS
WOLF RANDOLPH VIETH
BY Herbert Mc Dolfson
ATTORNEY

United States Patent Office

Re. 27,771
Reissued Oct. 2, 1973

27,771
PROCESS FOR QUENCHING EXTRUDED POLYMERIC FILM

John Edward Owens, Hockessin, Del., and Wolf Randolph Vieth, Belle Mead, N.J., assignors to E. I. du Pont de Nemours and Company, Wilmington, Del.

Original No. 3,223,757, dated Dec. 14, 1965, Ser. No. 126,818, July 21, 1961. Application for reissue Nov. 11, 1971, Ser. No. 197,914
Int. Cl. B29d 7/02
U.S. Cl. 264—22 15 Claims

Matter enclosed in heavy brackets [ ] appears in the original patent but forms no part of this reissue specification; matter printed in italics indicates the additions made by reissue.

*ABSTRACT OF THE DISCLOSURE*

This invention relates to the preparation of organic thermoplastic polymers in the form of thin films. More particularly, the invention relates to the preparation of melt extruded polymeric films *utilizing an electrostatic charge to cause the extruded film to adhere firmly to a quenching surface in the process.*

This application is a continuation-in-part of our copending application Ser. No. 26,471, filed May 3, 1960, now abandoned.

A common method for preparing organic thermoplastic polymeric films is to extrude the polymeric material while it is molten through a flat or circular extrusion die. After extrusion, the resulting molten or plastic polymeric film is cast upon a moving quenching member such as a cooled drum or belt, etc., where the film is cooled sufficiently to solidify it. Reduction of film thickness and reduction in width occur when the plastic polymeric film is stretched due to rotating the quenching drum or moving the quenching belt at a greater linear rate than the linear rate of extrusion. These problems are acknowledged and compensated for by setting the orifice opening of the extrusion die at a spacing larger than the desired thickness of the ultimate film and at a width wider than the desired width of the ultimate film. However, there are many other difficulties encountered in the process wherein a substantially hot film issues from the orifice onto a cool quenching surface. Some films tend to slip off the surface of the quenching member. In some cases, if slippage does not occur, the films tend to neck in (reduce in width very markedly) upon being cooled on the quenching surface. In short, the forces acting on plastic film during quenching tend to form an imperfect film of irregular width.

An object of the present invention is to overcome the difficulties encountered during quenching. Specifically, the primary object is to provide a process for quenching molten polymeric film upon a moving quenching member successfully without affecting the properties of the film adversely and producing a substantially homogeneous film of uniform width. Another object is to provide a process wherein at least the edges of the film are adhered securely to the surface of the quenching member, particularly at the points of initial contact between the molten film and the surface of the quenching member. Still another object is to provide a process wherein improved adhesion to the quenching member at lower and more effective quenching temperature is obtained. Other objects will appear hereinafter.

The objects are accomplished by extruding a molten, thermoplastic, film-forming, polymeric material in the form of a thin film onto an electrically grounded moving quenching surface; depositing an electrical charge of at least 0.23, preferably at least 1.1 microcoulombs per square inch on the upper surface of the film at least adjacent to each side edge of the film, preferably across the complete width of the film, in a continuous and uniform manner prior to a point where the film first contacts the quenching surface, whereby the film is caused to adhere firmly to the quenching surface.

It should be understood that the electrically grounded moving quenching surface may actually be a polyethylene-coated or other plastic-coated roll or a roll finished with a non-conductive aluminum oxide or other oxide-coated roll. In these cases, one might look at the coating on the metallic roll and the polymeric film passing thereover as a single insulator. The total thickness of such insulator (coating plus film) should be no greater than about 150 mils for effective operation. Thus, where the electrically grounded moving surface is an uncoated metallic quenching roll, the thickness of the film may be up to about 150 mils. For most films, however, where the thickness of the film at the quenching roll is no greater than about 25 mils, the roll could be a grounded electrical conductor with a thin non-conductive coating of up to about ⅛ inch (125 mils). Of course, the thinner the insulator, the more efficient the pinning obtained for the film on the quenching surface. The thinnest film operable in the present invention is determined by practical considerations. [It is difficult to quench films in accordance with the process of the present invention where the thickness of the film is less than ¼ mil.]

Besides permitting quenching on the drum without any substantial reduction in the width of the film, the process provides other surprising advantages. [In prior quench processes, there was a tendency for the film surface nearest the quench surface to solidify before the remainder of the film solidified.] Because of the intimate contact between the film and the quenching surface achieved by the process of the present invention, the transfer of heat from the complete thickness of the film to the quenching or cooling surface is substantially improved. [The result is substantially simultaneous solidification throughout the complete thickness of the film.] [The efficient heat transfer obtained by this] *This* process also enables one to use lower quench temperatures than had previously been possible. This serves to increase even further the efficiency of the quenching process.

In addition to more efficient heat transfer, the process also serves to eliminate "Venetian blind haze" in the resulting film. This type of haze was characterized by alternate clear and hazy lines along the length of the film. It [was] *is* believed that these alternate lines resulted from entrapment of air between the film and the quenching surface. By using the electrostatic charge specified in accordance with the present process, very intimate contact between the plastic film and the quenching surface is obtained. The result is that air is either not entrapped or, if entrapped, squeezed out before quenching has progressed to any substantial degree.

To obtain the deposition of at least 1.1 microcoulombs per square inch, preferably no more than 3.91 microcoulombs per square inch for polyethylene terephthalate film,* several critical requirements must be followed:

(1) A positive or negative current, but not both, must be used. A direct current (DC) voltage supply is generally used for this purpose. It is also possible to use a pulsating supply superimposed on a DC supply if the polarity of the resultant current does not undergo any change, i.e., remains either positive or negative.

*This value may be exceeded when the film is at elevated temperatures due to leakage of current from the film via conduction. The conductivity of the film is a function of temperature.

(2) A non-uniform electrostatic field [gradient] must be established between the distributor of electricity (the electrode) and the grounded drum over which the film passes so that the field is substantially higher immediately adjacent to the electrode than immediately adjacent to the film on the drum. Specifically, the electrostatic field [gradient] in the vicinity of the electrode must be sufficient to ionize the medium (usually air) in that region, i.e., it must be at least 30,000 volts/centimeter for air. In the vicinity of the film, the electrostatic field must be below 30,000 volts/centimeter to prevent ionization of the air. Ionization of the air in the region near the film will tend to affect the film adversely, perhaps even charring the film.

(3) The current measured adjacent to the film must be correlated with the speed of the film so that the current is at least 24 microamperes/square yard of film on which the deposit of electrostatic charge is sought/minute.

The non-uniform electrostatic field [gradient] is obtained by a critical design of the electrode. The design should be such that a uniform surface is presented to the film, the surface containing no more than 0.39 square inch (0.125 inch in diameter) per linear inch of the electrode, preferably no more than 0.015 square inch per linear inch of the electrode. This maximum preferred surface may be obtained by using a substantially cylindrical electrode such as at least one fine wire of up to 0.125 inch diameter or a knife edge having a radius of curvature of up to 0.005 inch. Alternatively, this electrode surface may be obtained by using a series of laterally spaced needle probes. In the case of needles, which may be considered to be hemispheres at the surface presented to the film (their points), a diameter of up to 0.125 inch may be used. Theoretically, there is no precise minimum surface that can be specified for the electrode, below which one cannot produce the non-uniform electrostatic field [gradient]. However, a surface of less than 0.0016 square inch per linear inch for a wire electrode is not sufficiently durable to be practical in the present invention. A knife edge electrode could be even sharper while retaining adequate strength. The most effective electrode is a fine wire having a diameter of 1–20 mils.

The DC voltage supply must be capable of producing very low current, on the order of 24–240 microamperes per square yard per minute at a voltage of 2–30 kilovolts. The minimum of 2 kilovolts has been found necessary to provide the proper electrostatic field [gradient] of at least 30,000 volts per centimeter for air at the surface of the critical electrode where the distance between the electrode and the film approaches 0.06 inch and the film speed approaches a minimum of 2 feet per minute. The amount of voltage necessary in any particular case is that required to deposit [initially at least 0.23 microcoulombs] *sufficient charge* per square inch of material *to cause intimate contact between the material and the quenching surface* but less than an amount that would cause breakdown of the material. Under ideal conditions, i.e., no leakage of current from the film by conduction, the value that would cause breakdown of polyethylene terephthalate film would be 3.91 microcoulombs per square inch. The voltage necessary will depend on [the speed of the film as it passes the electrode,] the distance of the electrode from the surface of the film and the effectiveness of the particular electrode configuration. Generally, the speed of the film may vary anywhere from a few feet per minute to 500 yards per minute or higher and the distance between the electrode and the film may be anywhere from 0.0625 to 5 inches, preferably 0.5 to 1.5 inches. [It has been found that the total current necessary for pinning polyethylene terephthalate film at a quench temperature of 45° C. (effective pinning current plus current lost by leakage) is related to the film speed according to the following equation:

Total current (microamperes) = 26.7 speed (square yards/minute) + 96]

The density of electrostatic charge that will cause breakdown of a dielectric material such that the thermoplastic organic polymeric films used in the present invention may be calculated from the following formula:

$$\text{Maximum charge density}\left(\frac{\text{microcoulombs}}{\text{square inch}}\right)=\sigma_o K_e E$$

wherein $\phi_o$ is the permittivity of free space in microcoulombs²/newton-square inch;

$K_e$ is the dielectric constant of the material;

E is the dielectric strength in newtons/microcoulombs and normally depends on thickness of the material.

In the following table are the maximum allowable charge densities before breakdown for some representative materials:

TABLE I

| Material | Thickness (mils) | Dielectric strength (Newtons per microcoulomb) | Dielectric constant at 100 cycles per second and 20° C. | Maximum charge density (microcoulombs per sq. inch) |
|---|---|---|---|---|
| Polyethylene terephthalate | 1 | 217 | 3.16 | 3.91 |
| Polyethylene | 1 | 158 | 2.20 | 1.98 |
| Polyvinylchloride | 1 | 120 | 3.95 | 2.70 |
| Polyvinyl chloride/vinyl chloride | 1 | 158 | 5.16 | 4.65 |
| Polystyrene | 1 | 195 | 2.41 | 2.68 |
| Vinyl chloride/vinyl acetate | 1 | 158 | 2.89 | 2.60 |
| Rubber hydrochloride | 0.8 | 96 | 4.85 | 2.65 |
| Copolymer of tetrafluoroethylene and hexafluoropropylene | 1 | 158 | 2.1 | 1.89 |
| Copolymer of ethylene terephthalate and neopentyl terephthalate | 3.6 | 128 | 3.38 | 2.47 |

Besides applying to those materials in the above table, the present invention is applicable to all polymeric materials that are or can be extruded as molten films onto casting or quenching surfaces. Such materials include all varieties of vinyl polymers, polyamides including nylon, polyesters, polytetrafluoroethylene, etc., and copolymers thereof.

The invention will be more fully described with reference to the accompanying drawing wherein FIG. 1 is a view in perspective of the preferred mode of carrying out the process of this invention;

Figure 1:
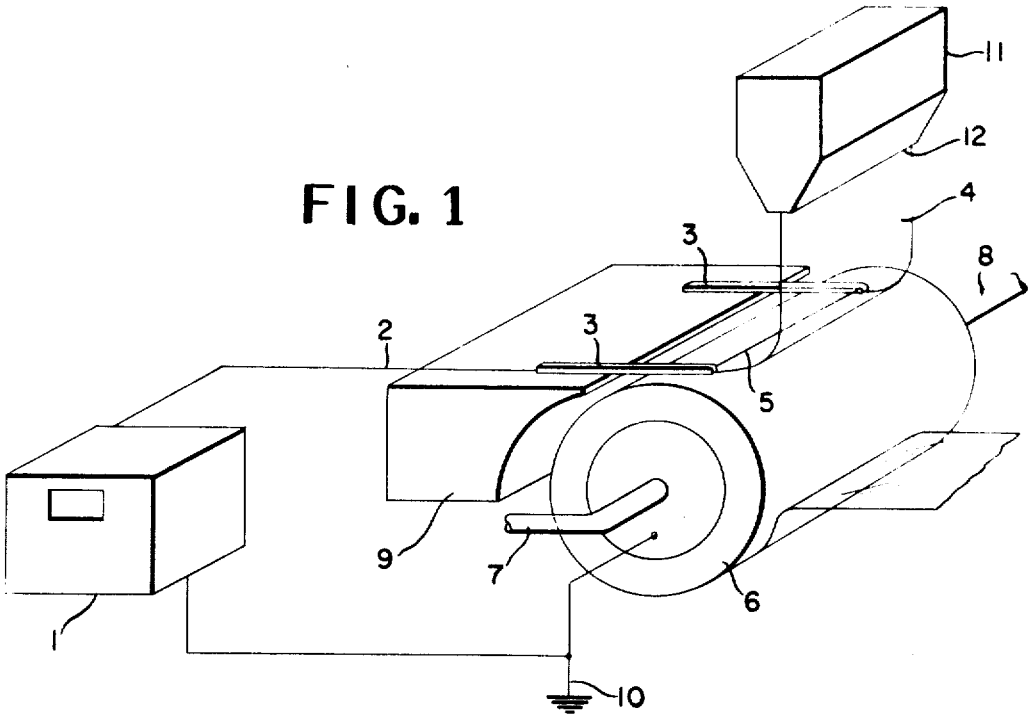

Referring to the drawing, molten synthetic thermoplastic film-forming polymeric material is extruded (polyethylene terephthalate at a temperature of 260° C.–280° C., polyethylene at a temperature of 235° C.–285° C., copolymers of polytetrafluoroethylene and 6.75%–27% by weight of hexafluoropropylene at a temperature of 350° C.–425° C. etc.) from an extrusion hopper 11 of any conventional design, through the orifice 12 onto the surface of a conventional, positively-driven quenching drum 6, driven by means not shown. The inlet and outlet to the quenching drum for cooling fluid are shown by 7 and 8, respectively. Between the orifice 12 and the point at which the extruded polymeric film 4 touches the quenching drum 6 is disposed a wire electrode 5, which may have a diameter of 0.001–0.125 inch and is made of tempered steel. Any other metallic conductor having adequate strength and dimensional stability may be employed as the electrode. Such materials include tungsten, "Inconel"-nickel-iron alloy, "Monel"-nickel alloy, copper, brass, stainless steel, etc. The wire electrode is supported by insulated electrode supports 3 and 13 mounted on a platform 9. The DC power supply and the quenching drum are grounded at 10. Sufficient voltage which is usually between 15 and 30 kilovolts is supplied from the DC power supply 1 through the high voltage supply cable 2 to the wire electrode 5 to provide at least 1.1 microcoulombs per square inch on the upper surface of the film and thus to force the film 4 into intimate contact with the quenching drum 6.

Figure 3:
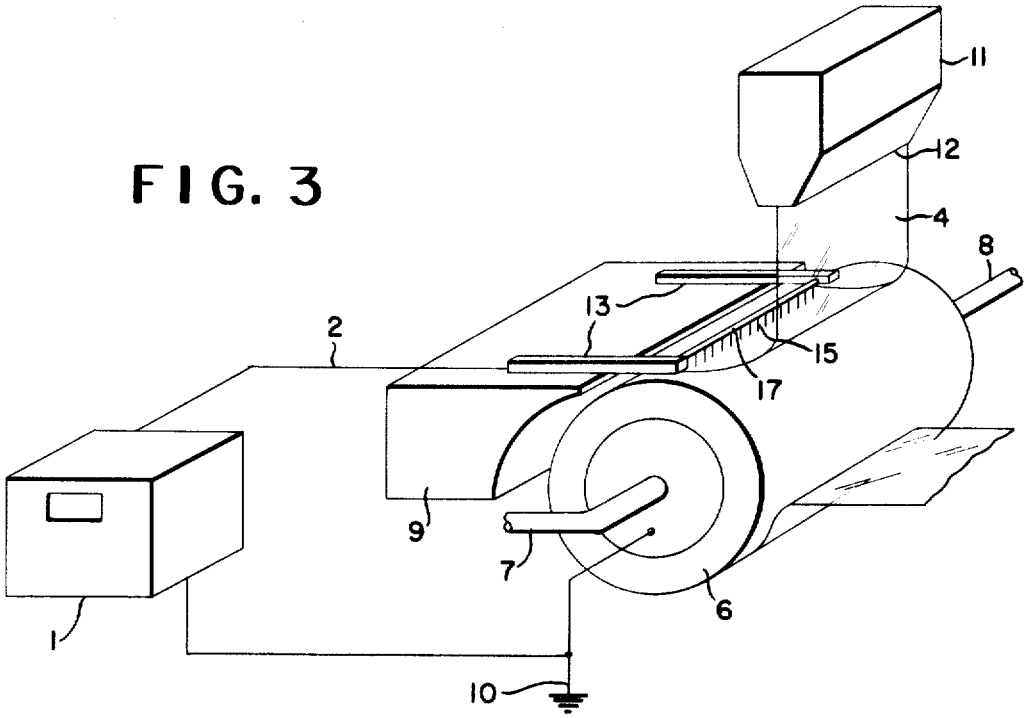
FIG. 3 is a view in perspective of another mode of carrying out the process of this invention.
Figure 2:
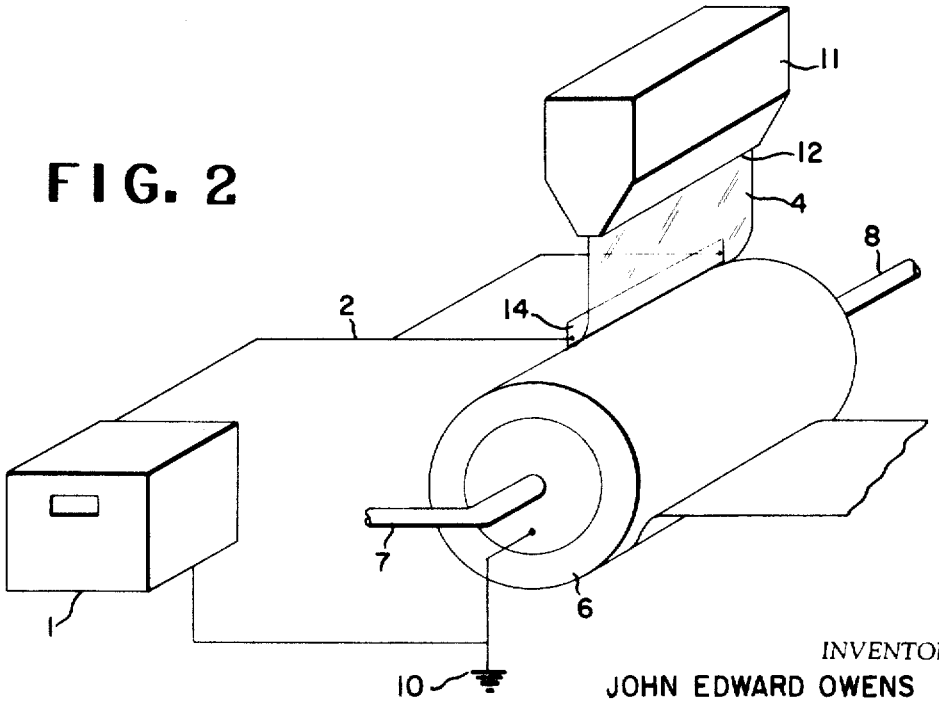
FIG. 2 is a view in perspective of another mode of carrying out the process of this invention.

The only differences from the above described arrangement in FIGS. 2 and 3 lie in substituting in FIG. 2 knife edge 14 for the wire of FIG. 1 and laterally spaced points 15 on a high conducting metal base such as a brass rod 17 in FIG. 3 for the wire in FIG. 1.

Figure 4:
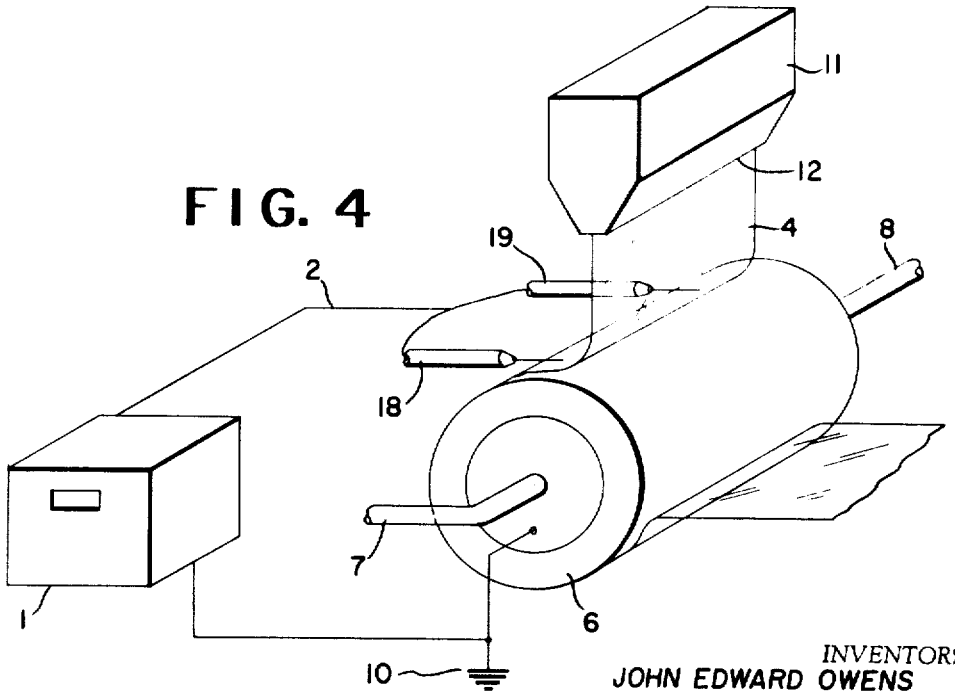
FIG. 4 is a view in perspective of another mode of carrying out the process of this invention.

In FIG. 4, two electrodes 18 and 19 in the form of needle probes are used in place of the electrodes of the previous figures. The probes are composed of high conducting metal rods honed to a sharp point. The radius at the points of the probes may vary anywhere from 0.001–0.125 inch. In all other respects, FIG. 4 is identical to the previous figures. The arrangement shown in FIG. 4 is particularly suited to the extrusion of light gauge films [having a thickness of less than 75 mils].

Figure 5:
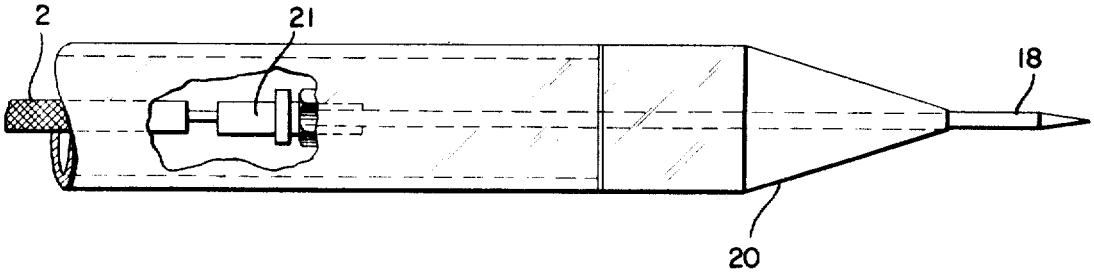
FIG. 5 is a view in elevation of the electrode shown in FIG. 4.

The details of the electrostatic probe are shown in FIG. 5. The essential metal rod 18 or 19 is inserted in a silicone glass tube 20 and the combination is held in place by supports not shown. The high voltage cable 2 from the power supply 1 is connected to the metal rod 18 or 19 by a conventional banana jack and plug 21.

The invention will be more clearly understood by referring to the examples which follow. These exampes are merely illustrations of the invention and should not be considered limitative thereof.

Example 1

Polyethylene terephthalate polymer prepared substantially as described in U.S. Pat. 2,465,319, was extruded at a rate of 150 lbs./hour through a conventional flat extrusion die at a temperature of 275° C. onto a quenching drum. The quenching drum was rotated at a rate of 28.3 yards/minute and was maintained at a temperature of about 45° C. by passing water at a temperature of 34° C. through the drum.

A 6-mil diameter tempered steel wire, approximately 19 inches long (the film was 18 inches wide as extruded) was stretched tautly 1.5 inch below the orifice lips of the extrusion die, 0.5 inch from the surface of the polyethylene terephthalate film and 0.5 inch from the line at which the polyethylene terephthalate film first contacted the quenching drum. The ends of the insulated supports were enclosed in heavy rubber tubing and supported by two burette clamps. A small diameter polytetrafluoroethylene-covered wire connected the wire electrode to the positive terminal of the direct current power supply. The negative terminal of the power supply and the quenching drum were grounded. A voltage of 15 kilovolts was impressed on the wire and a current of 200 microamperes was impressed on the film. [The film passed from the drum as a clear, uniform film having a width of 18 inches.]

As *a* Control [A], the same conventional extrusion and quenching apparatus was used but without the electrostatic charging device. [Instead, an air-pressure mechanism as shown in U.S. Pat. 2,736,066 was used in an effort to pin the extruded polyethylene terephthalate film to the surface of the quenching drum. With the temperature of the quenching drum at 45° C., the resulting film tended to fall off the drum, the air jets not providing sufficient force to pin the film to the drum at the reduced temperature and to overcome the presence of air trapped between the drum and the film surface.]

[As Control B, Control A was repeated but] *The* temperature of the quenching drum was raised to 67° C. However, the resulting film showed Venetian blind haze and [was only 12⅝ inches wide,] a 5⅜ inch reduction in width of the film of Example 1.

Examples 2 and 3

Example 1 was repeated at slower quench drum speeds to provide different film thicknesses and using impressed voltages sufficient to provide a deposited charge on the film of at least 1.1 microcoulombs per square inch. The conditions of the run and the amount of increased width obtaned over controls similar to *the* Control [B] of Example 1 are given in Table II below.

TABLE II

| Example | 2 | 3 |
|---|---|---|
| Cast film thickness (in.) | .01 | .02 |
| Speed of quench drum (yds./min.) | 7.3 | 3.7 |
| Impressed voltage (kilovolts) | 15.5 | 16.5 |
| [Deposited charge (microulombs/sq. in.)] | [1.42] | [3.5] |
| Width Increase over controls (in.) | 1⅞ | ¼ |
| Appearance of the film | Excellent | Excellent |

The deposited charge was calculated from the following equation:

$$\text{Deposited charge}\left(\frac{\text{microcoulombs}}{\text{square inch}}\right)=\frac{\text{current}\left(\frac{\text{microcoulombs}}{\text{second}}\right)}{\text{speed}\left(\frac{\text{inches}}{\text{second}}\right)\text{film width (in.)}}$$

Thus, for Example 2, the microamperes reading at the power supply was 90; the speed, 7.3 yards/minute; and the film width, [14.5] *W* inches. The deposited charge was 90/7.3 (36/60) *W* [14.5 or 1.42] microcoulombs/square inch.

Example 4

Polyethylene terephthalate polymer prepared substantially as described in U.S. Pat. 2,465,319 was extruded through a flat extrusion die at a temperature of 275° C. onto a quench drum as in Example 1. An electrostatic probe, composed of needles of 0.0015 inch radius at their tips mounted every ¼ inch on a 20-inch long brass bar, was positioned below the lips of the extrusion die transverse to the direction of extrusion of the substantially molten film. The points of the needles were about 1 inch above the film on the drum at the point of contact. The ends of the bar were clamped in heavy rubber tubing by two burette clamps and connected, as in Example 1, to a DC power supply.

Two methods were employed to obtain temperature of the film on the quench drum. In one, a small thermocouple attached to a long lead wire was passed between the molten film and the drum and allowed to travel completely around the drums. Temperatures at various points around the quench drum were measured by a potentiometer. In the second method, the thermocouple was dragged on the outside of the film at various points. It was insulated from the air by an asbestos glove. Both methods produced substantially the same results.

After positioning the electrode, the direct current power supply was turned on. The quench drum temperature was decreased to obtain optimum quenching. The film widened as soon as the voltage increased.

Complete data are presented in the table below.

Prior to the mounting of the electrode-retaining bar, temperature measurements were made on the polyethylene terephthalate film pinned by conventional means (the air pressure mechanism of U.S. Pat. 2,736,066). The data taken are presented in the table as Control A.

TABLE III

| Example | Control A | 4 |
|---|---|---|
| Thickness of film (in.) | 0.0035 | 0.0035. |
| Rate of extrusion of polymer, lbs./hr. | 50 | 50. |
| Quench water temperature (° C.) | 70 | 34. |
| Quench drum speed (yards/min.) | 8.7 | 8.7. |
| Temperature at various angles from point where polymer touches drum: | | |
| 0° | 210–225° C | 210–225° C. |
| 45° | 120–180° C | 45° C. |
| 90° | 83–150° C | 45° C. |
| 135° | 75–120° C | 45° C. |
| Strip off point | 74–100° C | 45° C. |
| Voltage, KV | Air pressure mechanism used. | 17.0. |
| Electrode angle (from horizontal) | No electrode | 45°. |
| Electrode to drum distance (in.) | do | 1". |

Example 5

Example 4 was repeated using a higher rate of polymer extrusion and a higher quench drum speed. The conditions used and the results obtained are given in Table IV below.

TABLE IV

| | |
|---|---|
| Example | 5 |
| Thickness of film (in.) | 0.0035 |
| Rate of extrusion of polymer lbs./hr. | 100 |
| Quench water temperature (° C.) | 27 |
| Quench drum speed (yds./min.) | 18.4 |
| Temperature at various angles from point where polymer touches drum: | |
| 0° ° C | 210–225 |
| 45° ° C | 50 |
| 90° ° C | 50 |
| 135° ° C | 50 |
| Strip off point ° C | 50 |
| Voltage, kv. | 16.0 |
| Electrode angle (from horizontal) ° | 0 |
| Electrode to drum distance (in.) | 1½ |

Examples 6 and 7

In these examples, only the edges of a polyethylene terephthalate film were pinned to the quench drum as the film was being extruded. As in Example 1, polyethylene terephthalate polymer prepared substantially as described in U.S. Pat. 2,465,319 was extruded through a flat extrusion die at a temperature of 275° C. onto a quench drum. Two electrostatic probes, comprised of a ⅛ inch rod honed to a sharp point having an approximate 10° taper (approximate radius of 0.0015 inch), were positioned 1.5 inches below the lips of the extrusion die and perpendicular to the longitudinal axis of the quench drum at a distance of 0.5 to 1 inch above the two lateral edges of the extruded film at the point of contact of the film with the quench drum. The needle probes were held in place by pieces of tubing having a 1-inch outside diameter and a ⅝-inch inside diameter. The ⅛-inch rod with the needle point at the end was inserted in a silicone glass enclosure and the assembly suspended through the inside of the tubing as shown in FIG. 5. The electrodes were connected by a high voltage cable to the positive terminal of a DC power supply (the negative terminal and the quench drum were grounded) and impressed with a voltage shown in Table V. On application of the current to the electrodes, the edges of the film were pinned flat against the surface of the quench drum[, the electrostatic charge being at least 1.1 microcoulombs/sq. in. as shown in the table].

A cast film of excellent appearance and width uniformity was obtained. When the electrostatic probes were turned on, the quench drum temperature could be reduced. [from 70° C. for a control to 54° C.] Table V, below, lists the conditions and data on the resulting films for these examples.

TABLE V

| Example | 6 | 7 |
|---|---|---|
| [Thickness of extruded film (in).] | [0.005] | [0.018] |
| Width of extruded film (in.) | [20.5] | 20.5 |
| Quench drum speed (yds./min.) | 9.30 | 4.75 |
| Voltage impressed on electrode (kv.) | 6 | 10 |
| Amperage impressed on electrode (microampers) | [150] | 250 |
| [Charge (microcoulombs/sq. in.)] | [1.31] | [4.27] |
| Appearance of film | Excellent | Excellent |

Example 8

Polyethylene polymer ("Alathon" 22A—Du Pont Co.) was extruded through a conventional flat extrusion die at a temperature of 250° C. onto a metal quenching roll at a speed of 25 yards/minute. The film was extruded at an angle tangent to the circumference of the quench roll, the air gap between the die and the roll being 7 inches. The thickness of the cast film was approximately 0.0015 inch; its width was 28 inches. Two wire electrodes, 0.0019 inch in diameter, 16.5 inches long and spaced ¼ inch apart from each other were positioned 0.5 inch from the contact point of the film and quench roll along the longitudinal axis of the quench roll. The wire electrodes were held in place by means of insulated electrode supports. The electrodes were connected to the positive terminal of a high voltage DC power supply (Spellman High Voltage Co., Model PN–30–R) by means of high voltage wire. The negative terminal of the power supply and the quench roll were grounded. Application of 20 kilovolts from the power supply to the electrodes resulted in 3.47 microcoulombs of charge/square inch (75 microamperes/square yard/minute) to cause the polyethylene sheet to be pinned flat against the surface of the quench roll. An excellently appearing cast film was obtained. It was found possible to operate the quench roll at a temperature of 100° C., this temperature being about 30° C. lower than normally necessary where electrodes are not used.

Examples 9–14

Various thicknesses ranging from 0.0005–0.02 inch of a copolymer of tetrafluoroethylene and hexafluoropropylene containing 16% by weight of hexafluoropropylene units prepared as described in application Ser. No. 649,-451 filed Mar. 29, 1957 to Bro and Sandt and assigned to the assignee of the present application was extruded downwardly through the orifice lips of a conventional flat extrusion die at a temperature of 375° C. onto a grounded, oil-heated drum maintained at temperatures ranging from 105° C.–120° C. The extrusion die, which was set at an angle of 60 degrees with the horizontal plane, was positioned so that the orifice was ⅛ inch from the drum and 2 inches off center toward the rear of the drum. A copper wire electrode, 0.01 inch in diameter, 17.5 inches long was positioned 3/16 inch from the line at which the film first contacted the grounded drum. The wire electrode was held in place by means of an insulated electrode support as described in Example 8. The electrode was connected to the positive terminal of a high voltage DC power supply (Spellman High Voltage Co.—Model PN–30R) by means of high voltage wire. The negative terminal of the power supply and the oil-heated drum were grounded. Application of 3–9 kilovolts from the power suply to the electrode (sufficient to deposit at least 1.1 microcoulombs of charge per square inch on the surface of the film) caused the copolymer sheet to be pinned flat against the surface of the grounded drum. An excellent appearing cast film was obtained. Attempts to cast the copolymer film on the drum without the electrode in operation resulted in the film dropping completely off the drum. The results are summarized in Table VI.

TABLE VI

| Example No. | Film thickness (inch) | Voltage (kilovolts) | Quench drum surface temp. (° C.) | Film speed (feet/min.) |
|---|---|---|---|---|
| 9 | 0.0005 | 3.0 | 120 | 11.5 |
| 10 | 0.0010 | 4.9 | 120 | 9.5 |
| 11 | 0.0020 | 5.3 | 110 | 9.5 |
| 12 | 0.0050 | 5.0 | 110 | 5.6 |
| 13 | 0.0100 | 7.0 | 115 | 3.0 |
| 14 | 0.0200 | 9.0 | 105 | 2.0 |

As shown in the examples, improved heat transfer efficiency is obtained. [by the] *The* process of the invention [resulting] *results* in the ability to use lower quenching temperatures. Another surprising advantage of this invention is that the quenching drum is kept clean by the intimate contact between the film and the surface of the drum. The most important result of the present invention is the marked increase in quenching capacity obtained by using the present invention.

Having fully disclosed the invention, what is claimed is:

1. A process for quenching a freshly extruded polymeric film which comprises extruding a molten thermoplastic, film-forming, polymeric material in the form of a thin continuous film onto an electrically grounded moving quenching surface; passing said molten film in proximity to but out of contact with at least one electrode to deposit on the upper surface of said film before said film has solidified an electrostatic charge sufficient to cause said film to adhere firmly across its width to said quenching surface; and withdrawing a solidified continuous film from said quenching surface.

2. A process for quenching a freshly extruded polymeric film which comprises extruding a molten thermoplastic, film-forming, polymeric material in the form of a thin continuous film onto an electrically grounded moving quenching surface; passing said molten film in proximity to but out of contact with at least one electrode to deposit in a continuous and uniform manner at least 0.23 microcoulomb per square inch on the upper surface of said film before said film has solidified at least adjacent to each side of said film to cause said film to adhere firmly across its width to said quenching surface; and withdrawing a solidified continuous film from said quenching surface.

3. A process as in claim 2 wherein said molten, thermoplastic, film-forming, polymer material is polyethylene terephthalate at a temperature of 260–280° C.

4. A process as in claim 2 wherein said molten, thermoplastic, film-forming polymeric material is polyethylene terephthalate at a temperature of 260–280° C. and the electrostatic charge deposited on the upper surface of the film is between 1.1 and 3.91 microcoulombs per square inch.

5. A process as in claim 2 wherein said molten, thermoplastic, film-forming, polymeric material is a copolymer of tetrafluoroethylene and 6.75%–27% by weight of hexafluoropropylene at a temperature of 350°–425° C.

6. A process as in claim 2 wherein said molten, thermoplastic, film-forming, polymeric material is polyethylene at a temperature of 235–285° C.

7. A process for quenching a freshly extruded polymeric film which comprises extruding a molten thermoplastic, film-forming, polymeric material in the form of a thin continuous film onto an electrically grounded moving quenching surface; passing said molten film in proximity to but out of contact with at least one electrode to deposit in a continuous and uniform manner at least 0.23 microcoulomb per square inch along a line on the upper surface of said film before said film has solidified, the line extending across the width of said film to cause said film to adhere firmly across its width to said quenching surface; and withdrawing a solidified continuous film from said quenching surface.

8. A process for quenching a freshly extruded polymeric film which comprises extruding a molten, thermoplastic, film-forming, polymeric material in the form of a thin continuous film onto an electrically grounded moving quenching surface; passing said molten film 0.03–5 inches from the extremities of an electrode closest to said film, said electrode disposed across the width of said film prior to a point where said film first contacts said quenching surface, said electrode having a surface area of 0.0016–0.39 square inch per linear inch of electrode, said surface area measured in a plane through said extremities of said electrode; and impressing a voltage of up to 30 kilovolts on said electrode whereby said film is caused to adhere firmly across its width to said quenching surface; and withdrawing a solidified continuous film from said quenching surface.

9. A process for quenching a freshly extruded polymeric film which comprises extruding a molten, thermoplastic, film-forming, polymeric material in the form of a thin continuous film onto an electrically grounded moving quenching surface; passing said molten film 0.5–1.5 inches from the extremities of an electrode closest to said film, said electrode disposed across the width of said film prior to a point where said film first contacts said quenching surface, said electrode having a surface area of 0.003–0.015 square inch per linear inch of electrode, said surface area measured in a plane through said extremities of said electrode; and impressing a voltage of 2–30 kilovolts on said electrode whereby said film is caused to adhere firmly across its width to said quenching surface; and withdrawing a solidified continuous film from said quenching surface.

10. A process as in claim 9 wherein the electrode is a fine wire having a diameter of 1–20 mils.

11. A process as in claim 9 wherein the electrode is a knife edge having a radius of curvature of up to 0.005 inch.

12. A process as in claim 9 wherein the electrode is a series of laterally spaced needles each having a diameter of up to 0.125 inch at their points.

13. A process as in claim 9 wherein the film is polyethylene terephthalate film.

14. A process as in claim 9 wherein the film is polyethylene film.

15. A process as in claim 9 wherein the film is a tetrafluoroethylene/hexafluoropropylene copolymer film.

References Cited

The following references, cited by the Examiner, are of record in the patented file of this patent or the original patent.

UNITED STATES PATENTS

| | | | |
|---|---|---|---|
| 2,336,745 | 12/1943 | Manning | 264—10 |
| 2,425,652 | 8/1947 | Starkey | 117—93.44 |
| 2,615,822 | 10/1952 | Huebner | 264—24 |
| 2,636,216 | 4/1953 | Huebner | 264—22 |
| 2,810,426 | 10/1957 | Till et al. | 264—24 |
| 2,881,470 | 4/1959 | Berthold et al. | 204—312 |
| 3,068,528 | 12/1962 | Owens | 264—216 |
| 287,957 | 1883 | Osborne | 226—1 |
| 2,736,066 | 2/1956 | Chren et al. | 264—216 |
| 3,082,735 | 3/1963 | Vaccaro | 118—244 |
| 3,121,915 | 2/1964 | Heller, Jr. | 264—216 |

ROBERT F. WHITE, Primary Examiner

G. AUVILLE, Assistant Examiner

U.S. Cl. X.R.

264—216